Jan. 27, 1925.  
J. W. GALLOWAY  
AUTOMOBILE HEADLIGHT TURNING DEVICE  
Filed April 19, 1924   2 Sheets-Sheet 1
1,524,351
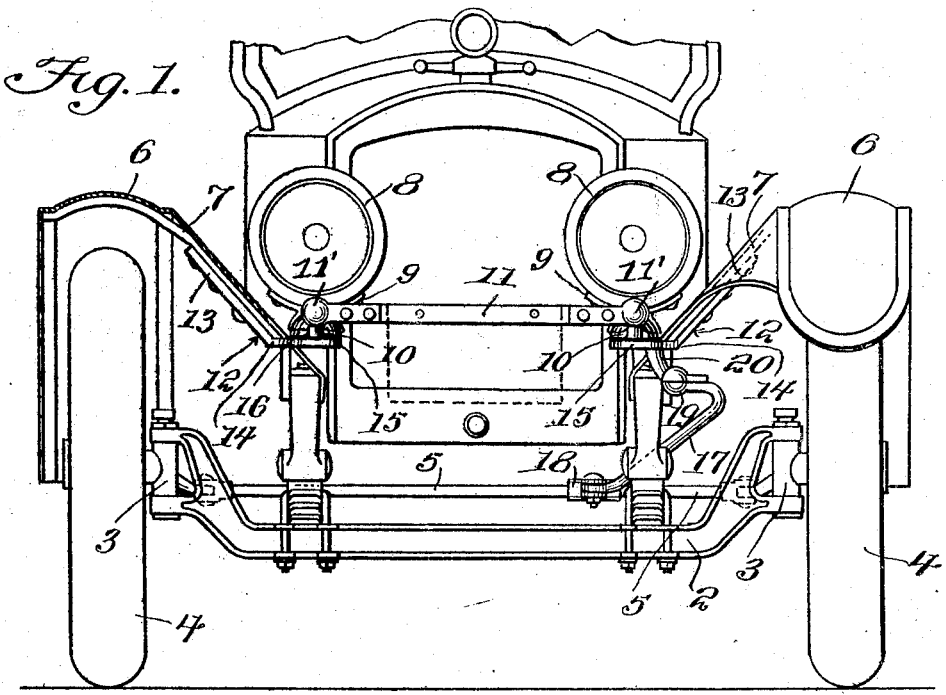
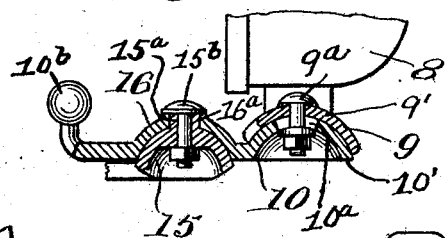
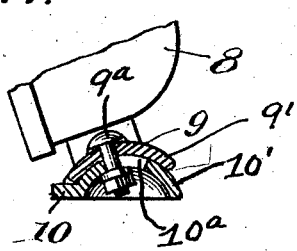
INVENTOR:
James W. Galloway
By C. C. Hines ATTORNEY.

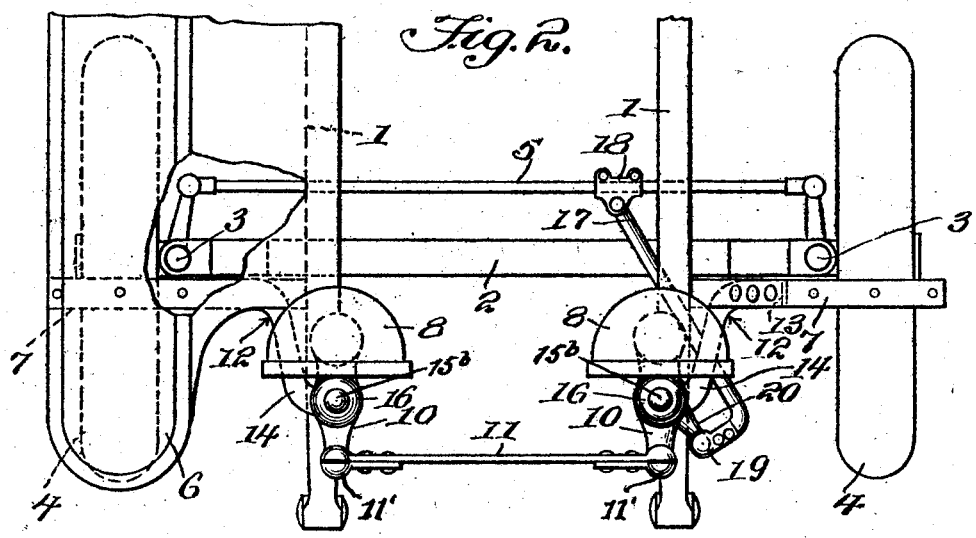
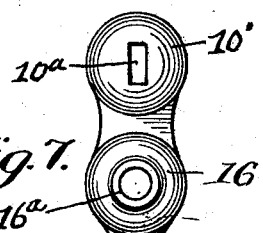
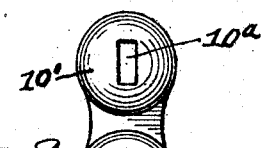
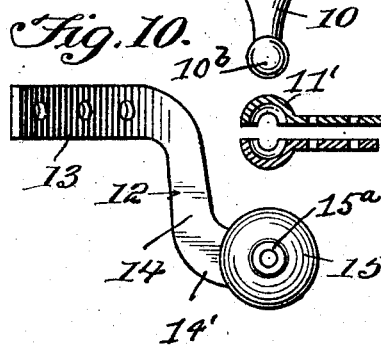
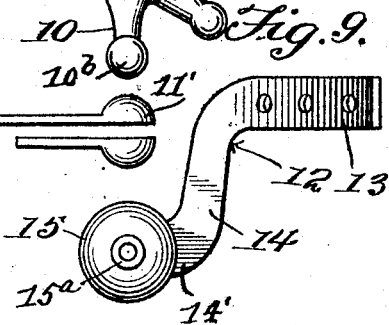

Patented Jan. 27, 1925.

1,524,351

UNITED STATES PATENT OFFICE.

JAMES W. GALLOWAY, OF WOLCOTT, NEW YORK.

AUTOMOBILE HEADLIGHT-TURNING DEVICE.

Application filed April 19, 1924. Serial No. 707,747.

*To all whom it may concern:*

Be it known that I, JAMES W. GALLOWAY, a citizen of the United States, residing at Wolcott, in the county of Wayne and State of New York, have invented new and useful Improvements in Automobile Headlight-Turning Devices, of which the following is a specification.

This invention relates to dirigible headlights for automobiles and other like vehicles, the object of the invention being to provide simple, reliable and efficient means for rotatably supporting the headlights and coupling the same to the front steering gear of the vehicle, whereby the headlights will be turned with the front wheels to throw the rays of light therefrom straight ahead at all times in the direction of travel of the vehicle.

The invention consists of the features of construction, combination and arrangement of parts, hereinafter fully described and claimed, reference being had to the accompanying drawings, in which:—

Figure 1 is a front elevation of an automobile embodying my invention.

Figure 2 is a top plan view of the front axle and associated parts of the vehicle, one of the front fenders being omitted and the other partly broken away.

Figure 3 is a longitudinal section through one of the lamp supporting arms and associated parts.

Figure 4 is a similar view showing the adjustability of the lamp on its supporting arm.

Figure 5 is a plan view of the lamp carrying bracket.

Figure 6 is a view, partly in side elevation and partly in section, of the connecting rod uniting the lamp supporting arms.

Figure 7 is a top plan view of one of the lamp supporting arms.

Figure 8 is a similar view of the other lamp supporting arm.

Figures 9 and 10 are top plan views of the right and left hand supporting brackets.

Referring now more particularly to the drawings, 1 designates the chassis frame of the vehicle, 2 the front axle, 3 the steering knuckles carried thereby, 4 the front wheels, 5 the steering rod coupling the knuckles for simultaneous movement, 6 the front fenders, and 7 braces connecting said front fenders with the chassis frame 1. The steering rod 5 is coupled in the usual or any approved manner to the steering post of the vehicle, the steering post and associated parts for transmitting motion thereto being omitted as not essential to a disclosure of my invention.

The headlights 8, which may be of any ordinary or approved type, are provided upon their bases with attaching plates 9, bolted or riveted thereto, which attaching plates rest upon and are carried by swinging lamp supporting arms 10. The headlights 8 are mounted by the attaching plates upon the rear ends of said arms, which are coupled at their forward ends for swinging movement in unison by a connecting rod 11. The plates 9 are provided with hemispherical portions 9', the concaved surfaces of which engage the convex surfaces of hemispherical bosses 10' formed on the rear ends of the arms 10. Bolts $9^a$ carried by the portions $9^1$ extend through slots $10^a$ in the portions $10^1$ and are provided with clamping nuts for holding the brackets 9 in adjusted position. The bolts $9^a$ are adjustable in the slots $10^a$ to permit of a desired backward or forward tilting of the lamps 8 for focusing adjustment, as illustrated, for example, in Figure 4.

The arms 10 are centrally pivoted and supported upon substantially Z-shaped brackets 12 each having a rear arm 13, a forwardly projecting arm 14, and an inturned front extremity 14', the arms 13 and 14 being arranged substantially at an oblique angle to each other. The arms 13 of the respective brackets 12 are bolted, riveted or otherwise suitably fastened to the fender braces 7, and the arms 14 of said brackets thence project beneath the lamp supporting arms 10 and are provided with hemispherical bearing members 15, the convex surfaces of which seat within and engage the concaved faces of similarly formed bearing bosses 16 on the arms 10, whereby the arms 10 are centrally pivoted for swinging movements, laterally of the vehicle, upon the fixed bracket arms 14. The bearing members 15 are provided with bearing sleeves $15^a$ engaging bearing openings $16^a$ in the bearings 16, and bolts $15^b$ pass through the bearing members 15 and their sleeves $15^a$ and hold the parts properly assembled. These bolts are provided at their lower ends with retaining nuts and have headed upper ends resting on the upper surfaces of the sleeves $15^a$ and bearing members 16, such construction allowing the arms 10 to swing freely on the wear sustaining sleeves 15ª without any appreciable wear upon the bolts 15ᵇ and without any tendency of causing the bolts or their securing nuts to bind or work loose.

The arms 10 are so disposed that they normally lie paralled with the wheels 4 when the latter are traveling in a straight line parallel with the chassis frame 1, and said arms 10 are coupled to the steering rod 5 for swinging movements transversely of the vehicle in the same direction as the wheels 4. To this end a connecting rod 17 is provided which is pivotally fastened at its rear end by a clip 18 to the steering rod 5 and which is jointed at its forward end, as at 19, by a ball and socket or other similar joint, with one end of a crank arm 20, formed or provided upon the forward end of one of the lamp supporting arms 10. In practice the connecting rod 11 may be provided with sectional socket members 11' engaging ball members 10ᵇ on the arms 10, the construction and arrangement being such that movements in one direction or the other of the steering rod 5 will effect a forward or backward movement of the rod 17, which rod, through the crank connection 20, will transmit lateral swinging movements in one direction or the other to the lamp carrying arms 10 and lamps carried thereby, whereby the lamps will be swung in the direction of turning motion of the wheels. By means of the articulating connection 19—20 between the rod 17 and the lamp supporting arms 10, a free and easy movement of these parts is secured and lateral movement transmitted to the lamp carrying arms without any irregular or jerky actions.

It will be seen from the foregoing that the lamps will be mounted in such manner upon the vehicle as to turn automatically with the front steering wheels in the actuation of the latter by the steering mechanism, and that the means provided for steering and turning the lamps consists of a very small number of parts in toto, and of a minimum number of moving parts in particular, whereby a lamp turning mechanism of simple, reliable and efficient type is produced which may be manufactured, installed and maintained in working order at a comparatively low cost. Also it will be seen that the construction employing bearing members of the type described is such that a smooth and easy working motion of the lamps will be obtained notwithstanding the simplicity of the construction and comparatively small number of parts employed.

The connecting rod 17 as herein shown is coupled directly to the connecting rod 5, which is an arrangement suitable for Ford cars, but for other makes of cars the rod 17 may be coupled to the connecting arm of the steering gear, as will be readily understood; these methods of connecting the lamp turning mechanism to the steering gear being held to be mechanichal equivalents of one another, the first-named being shown for purposes of exemplification merely and as a matter of convenience.

Having thus fully described my invention I claim:

1. In a headlight turning device for vehicles, the combination with a vehicle frame having a front axle, front steering wheels, a steering rod connecting said wheels for imparting steering motion thereto, front fenders, and braces connecting said fenders with the chassis frame of the vehicle, of supporting brackets having rear arms arranged substantially at right angles to the line of the vehicle and secured to said braces and having front arms extending inwardly and forwardly at an angle and terminating in inwardly extending extremities lying substantially parallel with said rear arms, lamp carrying arms pivotally mounted intermediate their ends upon the inturned extremities of the brackets, lamps supported upon the rear ends of said lamp carrying arms, a connecting rod coupling the front ends of said lamp carrying arms, one of said lamp carrying arms being provided with a crank member, and a connecting rod between said crank member and a part of the steering mechanism of the front wheels.

2. In a dirigible headlight for vehicles, lamp supporting brackets having hemispherical bearing portions, a lamp supporting arm carried by each bracket, each lamp supporting arm having an intermediate hemispherical bearing portion and a rear hemispherical bearing portion, the concave face of said intermediate hemispherical bearing portion engaging the convex face of the hemispherical bearing portion of the bracket, lamps provided with hemispherical bearing portions having their concave faces engaging the convex faces of the rear hemispherical bearing portions of the brackets and adjustably connected therewith, a connection between the forward ends of the lamp carrying arms adapting them to swing in unison, and means for connecting one of said lamp carrying arms with a part of the steering gear of the vehicle.

3. In a dirigible headlight, lamp supporting brackets having hemispherical bearing portions, each provided with a bearing sleeve extending from the convex face thereof, a lamp supporting arm mounted on each bracket, each arm having an intermediate hemispherical bearing surface and a rear hemispherical bearing surface, the said intermediate bearing surface of each arm having its concave face engaging the convex surface of the hemispherical bearing portion and bracket and provided with an opening receiving the bearing sleeve thereof, a bolt passing through the hemispherical bearing portion of the bracket and the sleeve and having a headed end overlying the sleeve and intermediate hemispherical bearing surface of the arm, lamps provided with hemispherical bearing surfaces having their concave faces engaging the convex faces of the rear hemispherical bearing portions of the arms and adjustably connected therewith, a connection between the front ends of the lamp carrying arms adapting the same to swing in unison, and connecting means between one of said lamp carrying arms and a part of the steering mechanism of the vehicle.

4. In a dirigible headlight, supporting brackets provided each with a hemispherical bearing portion having a bearing sleeve extending upwardly from the convex face thereof, lamp supporting arms mounted upon the bearing brackets, each lamp supporting arm having an intermediate hemispherical bearing surface, the intermediate hemispherical bearing surface of each arm having its concave face engaging the convex face of the bearing portion of the bracket and provided with an opening receiving the sleeve thereof, and a rear hemispherical bearing surface of each arm being provided with an elongated slot, a bolt passing through the hemispherical bearing portion of each bracket and its sleeve and having a headed end overlying the sleeve and convex surface of the intermediate hemispherical bearing portion of the arm supported thereby, a lamp supported by each arm and provided with a hemispherical bearing portion having its concave surface engaging the convex face of the rear hemispherical bearing portion of the arm, a bolt passing through the hemispherical bearing surface of each lamp and adjustably engaging the slot in the rear hemispherical bearing surface of the lamp supporting arm, a connection between the forward ends of the lamp supporting arms adapting them to swing in unison, and connecting means between one of said arms and a part of the steering mechanism of the vehicle.

In testimony whereof I affix my signature.

JAMES W. GALLOWAY.